United States Patent
Von Esebeck et al.

[11] Patent Number: 5,934,241
[45] Date of Patent: Aug. 10, 1999

[54] INTERNAL-COMBUSTION ENGINE

[75] Inventors: Götz Freiherr Von Esebeck, Berlin; René Reif, Aichwald; Rolf Dürrstein, Bietigheim; Robert Ostertag, Tiefenbronn; Martin Weindorf, Kornwestheim, all of Germany

[73] Assignees: Mercedes-Benz AG, Stuttgart, Germany; Filterwerk Mann & Hummel GmbH, Ludwigsburg, Germany

[21] Appl. No.: 08/858,338

[22] Filed: May 19, 1997

[30] Foreign Application Priority Data

May 17, 1996 [DE] Germany ............................ 196 19 977

[51] Int. Cl.⁶ ...................................................... F01M 1/00
[52] U.S. Cl. ......................................... 123/196 R; 184/6.8
[58] Field of Search ......................... 123/196 R; 184/6.8, 184/104.1

[56] References Cited

U.S. PATENT DOCUMENTS

| | | |
|---|---|---|
| 1,596,432 | 8/1926 | Vincent . |
| 2,239,447 | 4/1941 | Ryder . |
| 2,318,276 | 5/1943 | Worthington . |
| 4,223,073 | 9/1980 | Caldwell et al. . |
| 5,158,053 | 10/1992 | Krechberger et al. ............... 123/196 R |
| 5,161,643 | 11/1992 | Ampferer .............................. 123/196 R |
| 5,408,965 | 4/1995 | Fulton et al. . |
| 5,595,152 | 1/1997 | Selly et al. ........................... 123/196 R |

FOREIGN PATENT DOCUMENTS

| | | |
|---|---|---|
| 1176924 | 8/1964 | Germany . |
| 2153278 | 6/1972 | Germany . |
| 2922695 | 12/1980 | Germany . |
| 2923993 | 12/1980 | Germany . |
| 4001468 | 7/1991 | Germany . |
| 4206068 | 9/1992 | Germany . |
| 4242513 | 6/1994 | Germany . |
| 4306431 | 7/1994 | Germany . |

OTHER PUBLICATIONS

Search Report Jul. 31, 1997 Europe.

*Primary Examiner*—John Kwon
*Attorney, Agent, or Firm*—Evenson, McKeown, Edwards & Lenahan, P.L.L.C.

[57] ABSTRACT

An internal-combustion engine, particularly for a motor vehicle, is provided with an oil pan. Oil ducts are molded into the housing of the oil pan. An oil filter housing with an oil filter and an oil pump is integrated in the oil pan. Together with the oil filter and the oil pump, the oil pan can be mounted and/or demounted as a unit to the internal-combustion engine.

27 Claims, 5 Drawing Sheets

INTERNAL-COMBUSTION ENGINE

BACKGROUND AND SUMMARY OF THE INVENTION

This application claims the priority of German application 196 19 977.8-13 filed in Germany on May 17, 1996, the disclosure of which is expressly incorporated by reference herein.

The invention relates to an internal-combustion engine, particularly for a motor vehicle, having an oil pan.

In the case of internal-combustion engines, in general, essentially only individual components, such as an oil filter, an oil pump, an oil pan, an oil cooler, sensors and additional assemblies required for this purpose are used in the oil circulating system.

From German Patent Document DE-OS 29 22 695, an arrangement of a lubricating oil filter and of a lubricating oil pump in a housing arranged below the engine is known which also serves as an oil pan or comprises it.

From German Patent Document DE-OS 29 23 993, an oil pan for internal-combustion engines is known which is cast in one piece and in which case a receiving device for an oil filter housing is molded to the exterior side of the oil pan. Furthermore, the oil pan is provided with oil ducts.

A two-part oil pan is known from German Patent Document DE-OS 42 42 513. In this case, a pan section contains a box-type oil filter.

It is an object of the present invention to provide an internal-combustion engine of the initially mentioned type, in the case of which, all or at least the most important functions and components of the oil circulating system are combined to form a subassembly which constitutes a ready-to-be-installed construction.

According to the invention, this object is achieved by providing an oil pan, having an oil pan housing, oil ducts, molded into the oil pan housing, and an oil filter housing with an oil filter and an oil pump integrated in the oil pan, wherein the oil pan, together with the oil filter and the oil pump, are configured to be mounted and/or demounted as a unit on the internal-combustion engine.

As a result of the construction of the oil pan according to the invention, a so-called oil module is created which, after a corresponding preassembling of all piece parts as a whole can be connected with the internal-combustion engine.

This integration of the oil circulating system into the oil pan saves many separate components, such as intake pipes, filter housings, cooler housings and similar devices. In addition to the facilitated mounting and a demounting which is facilitated for servicing and repair purposes, the solution according to the invention also has cost and weight advantages during the manufacturing of an internal-combustion engine.

In a constructive development, wall parts of the oil pan can form at least portions of housings of the individual assemblies of the oil circulating system, such as oil filter housings and oil coolers.

Other objects, advantages and novel features of the present invention will become apparent from the following detailed description of the invention when considered in conjunction with the accompanying drawings.

DETAILED DESCRIPTION OF THE DRAWINGS

In principle, the oil pan, together with the devices for the oil circulating system integrated therein, is of a known construction. Therefore, in the following description only the parts which are important for the invention will be described in detail.

Figure 1:
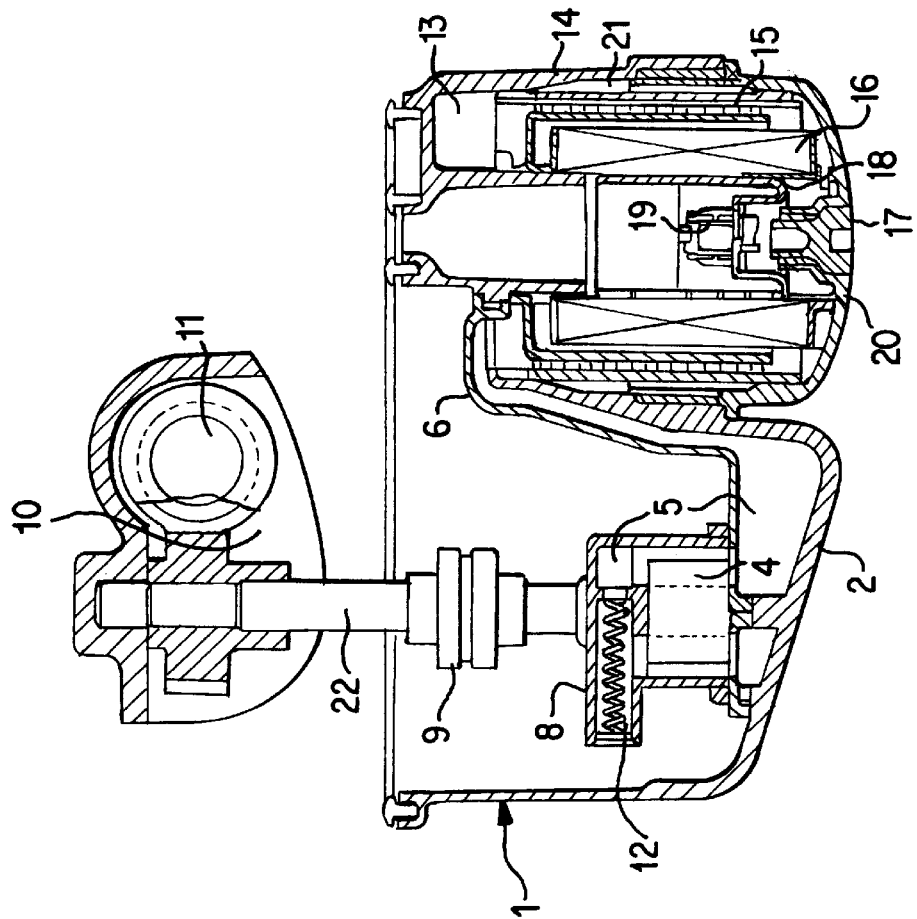
FIG. 1 is a vertical sectional view taken along Line I—I of FIG. 2, showing an oil pan assembly constructed according to a preferred embodiment of the present invention.
Figure 2:
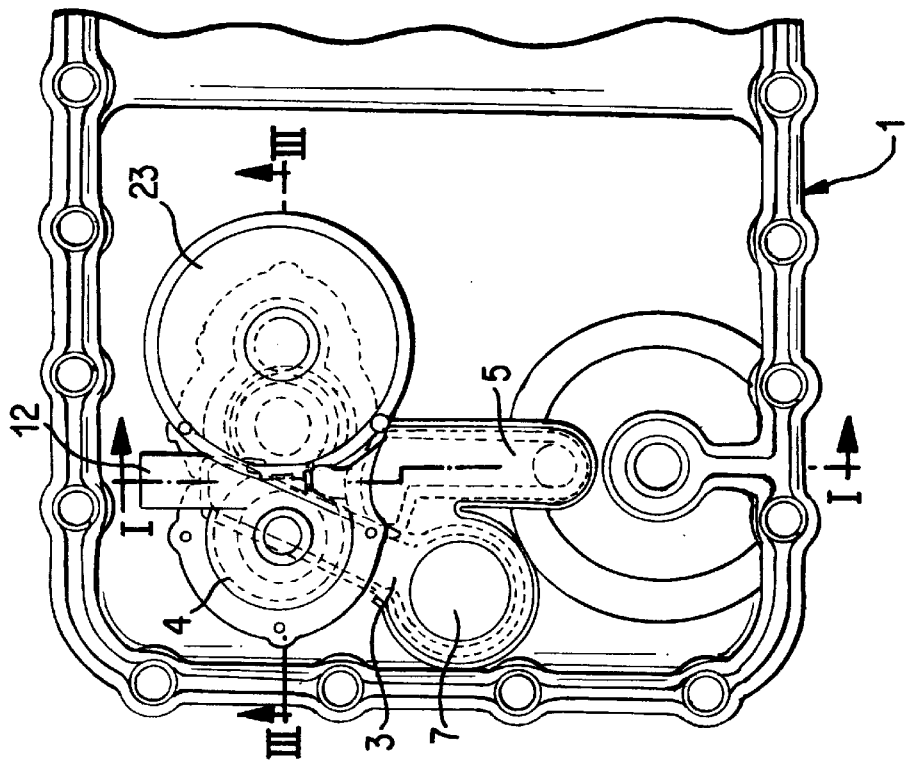
FIG. 2 is a partial top view of the oil pan assembly according to FIG. 1.
Figure 3:
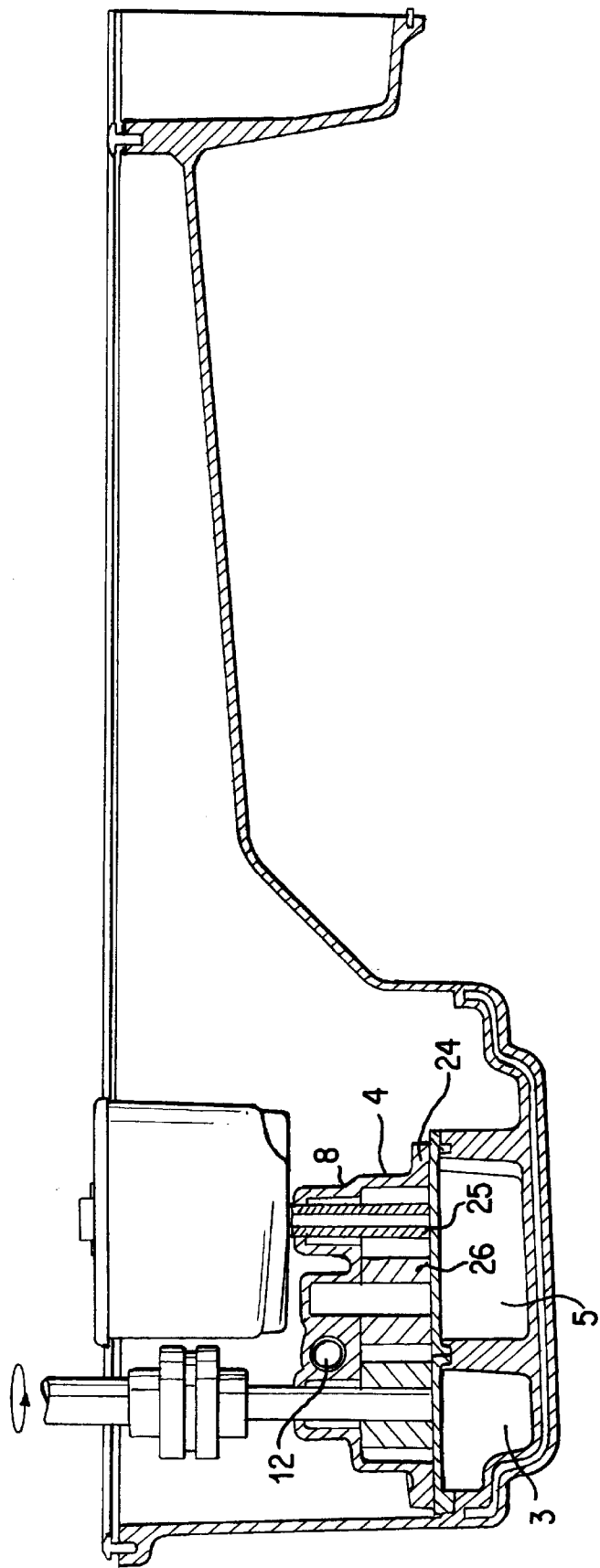
FIG. 3 is a sectional view taken along Line III—III of FIG. 2.
Figure 4:
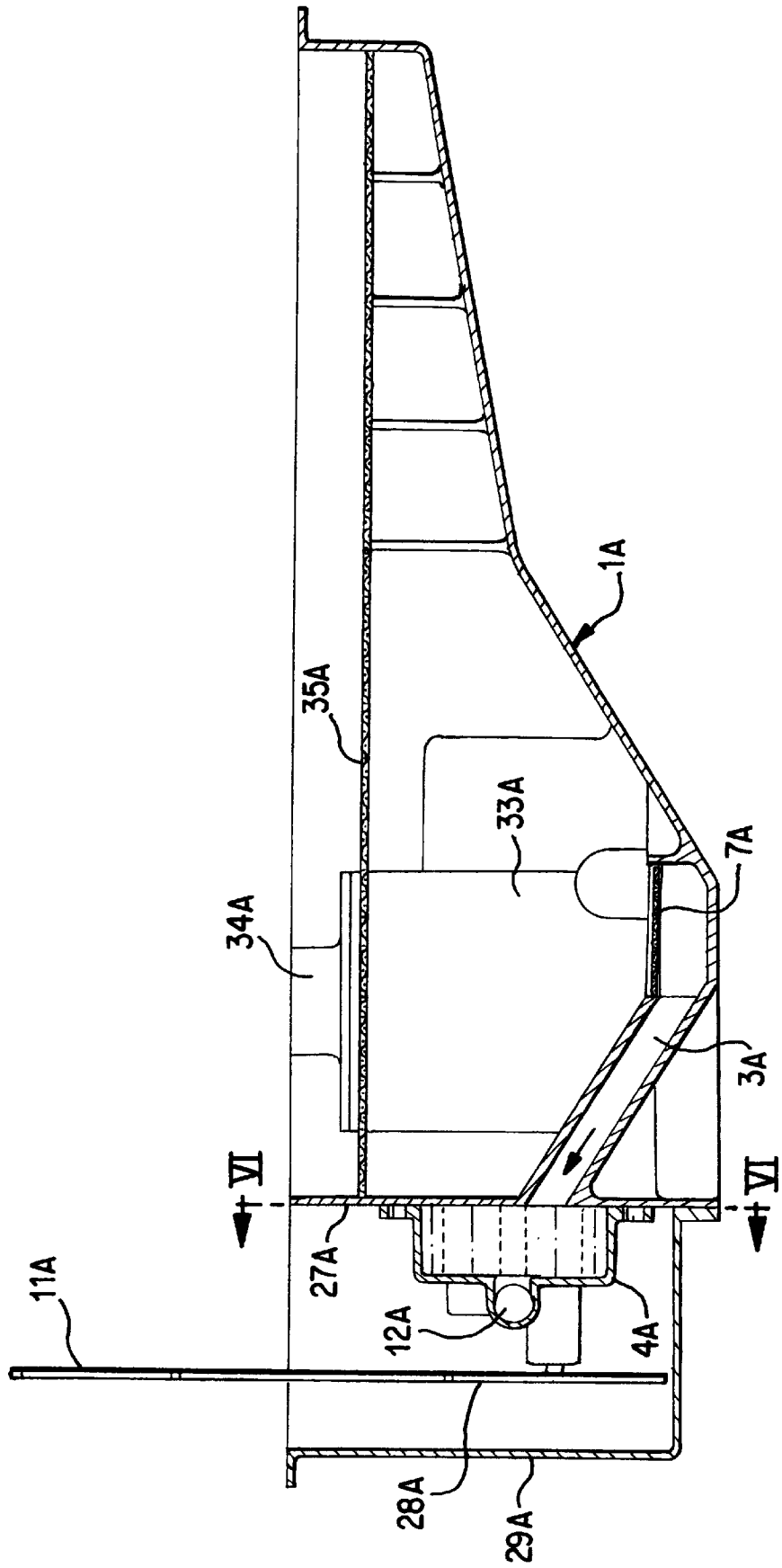
FIG. 4 is a vertical sectional view taken along Line IV—IV of FIG. 5 and showing a second embodiment of an oil pan assembly.
Figure 5:
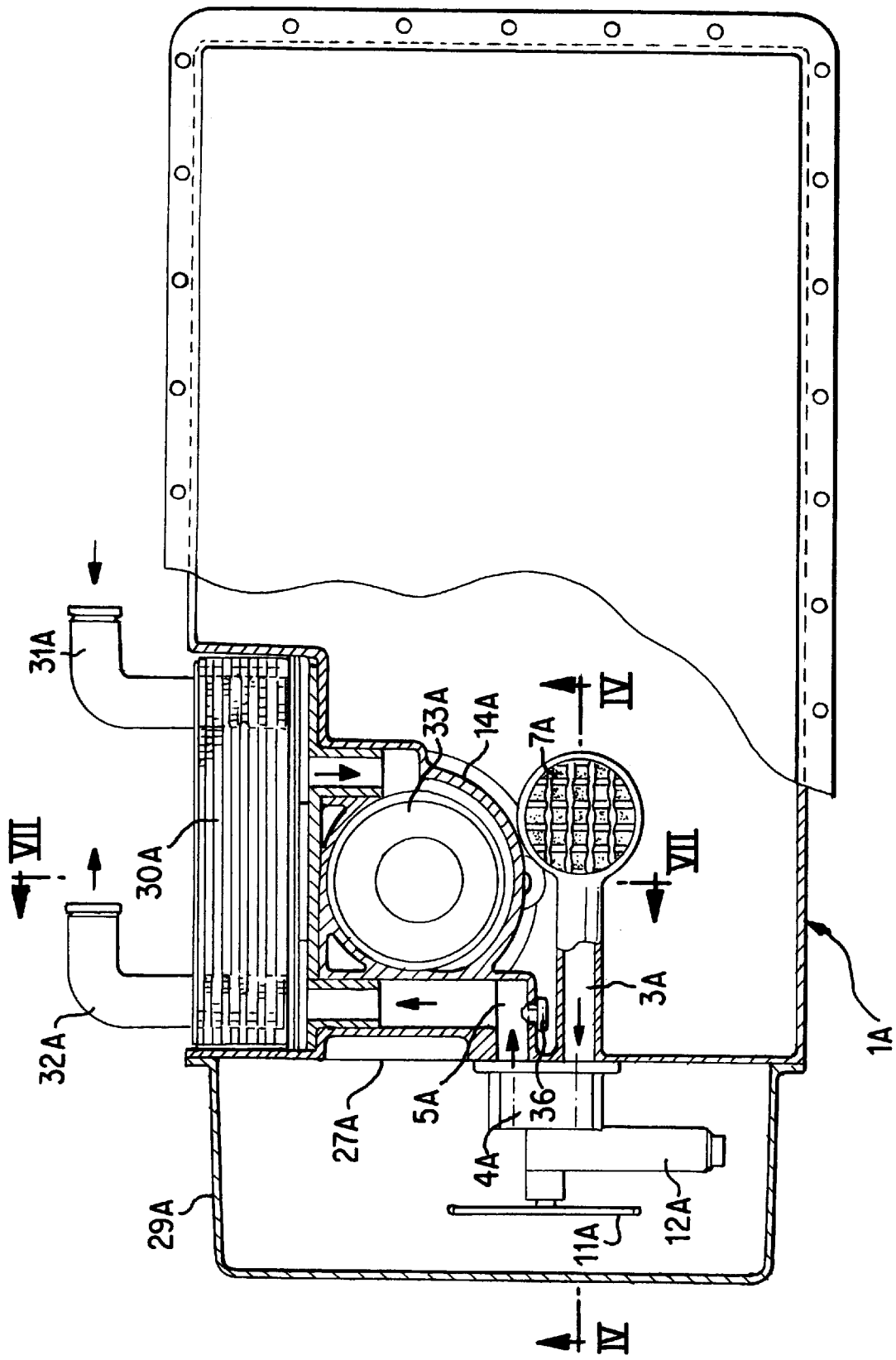
FIG. 5 is a partial top view of the oil pan assembly of FIG. 4.
Figure 6:
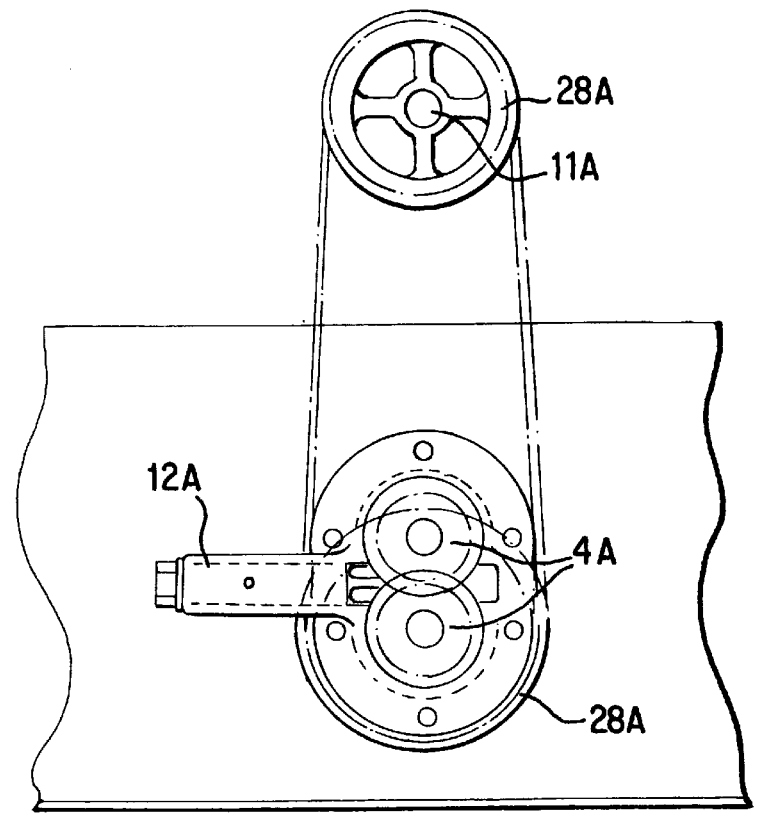
FIG. 6 is a sectional view taken along Line VI—VI of FIG. 4.
Figure 7:
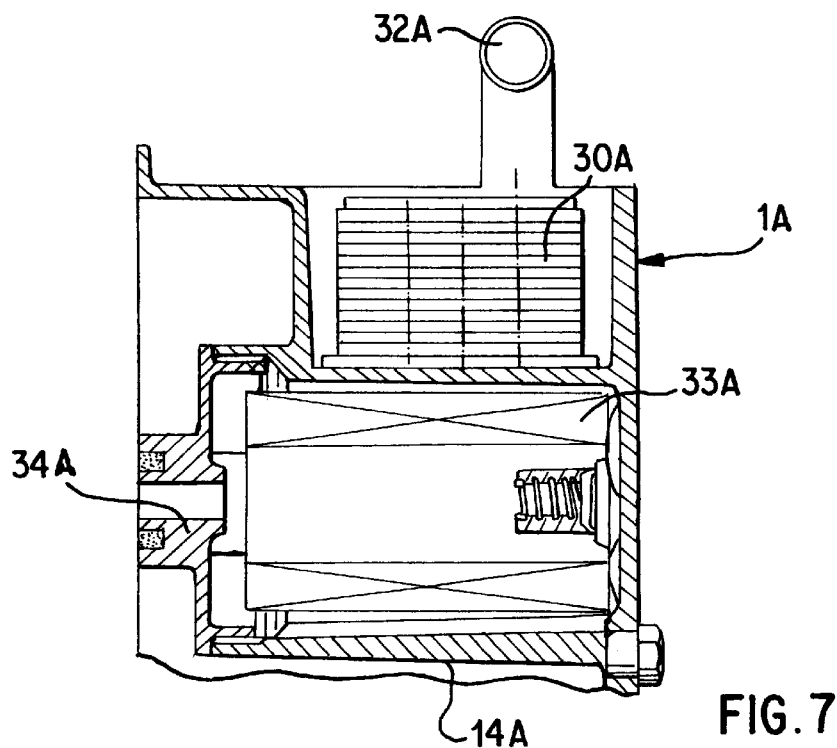
FIG. 7 is a sectional view taken along Line VII—VII of FIG. 5.

According to the embodiment of FIGS. 1 to 3, the oil pan 1 manufactured as an integral component is made of plastic or aluminum and has a sprayed-around sheet metal bottom element 2 in order to prevent a breaking or tearing in the case of an improper placing of the oil pan 1. In this manner, it is ensured that the oil storage function of the oil pan 1 is maintained. An oil intake duct 3 of an oil pump 4 and a delivery duct 5 starting from the oil pump 4 are provided. The delivery duct 5 is constructed as an ascending pipe. This prevents a draining of the oil ducts 3, 5 and of an oil filter 16 which is not described here in detail, even without any return flow stop. On the top side, the ascending pipe is covered by a plastic cover 6 having an intake sieve 7. The plastic cover 6, which closes off the oil pump 4 on the bottom side by way of a seal, is connected with the oil pan in an arbitrary manner, for example, by welding. As a result of this development, a closed delivery duct, which simultaneously is also used as a suction pipe, is formed for the pressure oil delivered by the oil pump 4. Therefore, the cover 6, at the same time, also represents a fastening device for the oil pump 4 in the oil pan 1.

An outside gear pump of a known construction, which is arranged in a diecast plastic or aluminum housing 8, may be selected as an oil pump 4. The diecast aluminum housing 8 is screwed onto the cover 6 by way of a seal which is not shown in detail. The pump 4 is driven by way of a drive 22 having an angular gear 10 from a crankshaft 11 of the internal-combustion engine. An elastic shaft coupling 9 is integrated in the drive 22.

A pressure regulating valve 12 for the oil pump 4 is constructed as a piston valve.

The oil delivered by the oil pump 4 is conveyed by way of the delivery duct 5 in the form of an ascending pipe into an upper annulus 13 of a filter housing 14 which is constructed as a wall portion of the oil pan 1. From the annulus 13, the oil flows through an oil-water ring cooler 15 which consists of two cooling plates which are bent in a jacket-shaped manner and which are soldered to a sheet metal pipe. The lower portion of the filter housing 14 simultaneously forms an upstream face 21. By way of corresponding connections, the upstream face 21 is connected with the cooling water circulating system of the internal-combustion engine.

After passing through the cooler 15, the oil flows through a filter device which may be constructed, for example, in a known manner as a metal-free filter cartridge or an oil filter 16.

An oil drain plug 17, a center pipe 18 and a filter bypass valve 19 may also consist of plastic and are integrated in an oil filter cover 20. This development permits a clean filter change by a complete draining of the oil in the filter space. The metal-free filter element in the form of a cartridge or the oil filter 16 can be supplied to a recycling process. All other components can be reused in the product life cycle.

By way of seals, which are not shown in detail, the oil pan 1 with all above-described device parts can be fastened to the bottom side of an engine crankshaft housing (not shown).

The oil pan 1 also accommodates a centrifuge 23. The centrifuge 23 is driven by a pinion 24 which meshes with a gear 26 of the oil pump 4. Generally, the rotational speed of the oil pump gears will be geared up. By way of a bore 25, a portion of the diverted flow of the oil is supplied from the delivery duct 5 to the centrifuge 23 for a precision cleaning.

The pressure regulating valve 12, which in the same manner as the regulating valve according to FIGS. 1 to 3 is constructed as a piston valve, in the case of a certain oil pressure, diverts excessively delivered oil directly toward the suction duct which represents an internal pressure diversion. This means that only the oil required by the internal-combustion engine must be taken in. In this manner, an improvement of the cavitation behavior and of a noise radiation of the oil pump 4 is achieved.

A second embodiment for implementing the module idea is illustrated in FIGS. 4 to 7. In this case, the oil pan 1A consists of two diecast plastic or aluminum parts. In the front—relative to the driving direction—, the oil pan 1A has a flange surface 27A on which the oil pump 4A with the pressure regulating valve 12A is fastened by way of a seal. The drive of the oil pump 4A takes place by way of a simple chain drive 18A from the crankshaft 11A. In the portion in which the oil pump 4A is situated, the forward portion of the oil pump is closed off by a cover 29A which advantageously represents the timing case cover of the internal-combustion engine.

The suction duct 3A and the delivery duct 5A are implemented by pockets in the aluminum diecasting and, after the casting, are removed from the mold from the direction of the flange surface 27A. Also in this case, the intake sieve 7A is constructed as a simple plastic part which is snapped into a corresponding recess of the oil pan 1A.

In the case of this embodiment, the oil arrives from the delivery duct 5A in a plate heat exchanger 30A which is integrated in the oil pan 1A and is laterally flanged to it. The plate heat exchanger 30A may be of a known construction. By way of an inflow connection piece 31A and a return flow connection piece 32A, the plate heat exchanger 30A is integrated in the cooling water circulating system of the internal-combustion engine.

From the plate heat exchanger 30A, the oil flows through a service life filter element 33A to the lubricating points of the engine. Naturally, in the case of this embodiment, an exchangeable filter cartridge can be provided instead of a service life filter element 33A. The filter housing 14A, which also in this embodiment is a portion of the oil pan 1A, is closed off on the top side by a simple cover which does not have to meet any special tightness requirements.

In order to minimize a foaming of the oil, a plastic grid 35A with an extrusion-coated wire gauze is additionally integrated in the oil pan and is connected with it, for example, by means of a clamping or snap system. In this case, the plastic grid 35A is situated above the highest filling level for oil in the oil pan 1A.

Also, other sensors, such as pressure, temperature, level sensors and similar sensors, can be inserted in the oil pan 1A at corresponding points, as, for example, sensor 36 shown in the delivery duct 5A. This can take place, for example, by a screwed connection.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Internal-combustion engine for a motor vehicle, comprising:
   an oil pan, having an oil pan housing,
   oil ducts molded into the oil pan housing, and
   an oil filter housing with an oil filter and an oil pump integrated in the oil pan,
   wherein the oil pan, together with the oil filter and the oil pump, is configured to be mounted and demounted as a unit on the internal-combustion engine.

2. Internal-combustion engine according to claim 1, wherein at least a portion of the oil filter housing is formed by a wall portion of the oil pan.

3. Internal-combustion engine according to claim 1, wherein a centrifuge is arranged in the oil pan.

4. Internal-combustion engine according to claim 2, wherein a centrifuge is arranged in the oil pan.

5. Internal-combustion engine according to claim 1, wherein said oil ducts include the delivery duct leading from the oil pump to the oil filter which is constructed as an ascending pipe whose highest point is situated above a normal in use oil level of the oil pan.

6. Internal-combustion engine according to claim 2, wherein said oil ducts include a delivery duct leading from the oil pump to the oil filter which is constructed as an ascending pipe whose highest point is situated above a normal in use oil level of the oil pan.

7. Internal-combustion engine according to claim 4, wherein said oil ducts include a delivery duct leading from the oil pump to the oil filter which is constructed as an ascending pipe whose highest point is situated above a normal in use oil level of the oil pan.

8. Internal-combustion engine according to claim 1, wherein the oil pump is disposed on a cover which simultaneously forms a fastening device for the oil pump in the oil pan.

9. Internal-combustion engine according to claim 2, wherein the oil pump is disposed on a cover which simultaneously forms a fastening device for the oil pump in the oil pan.

10. Internal-combustion engine according to claim 5, wherein the oil pump is disposed on a cover which simultaneously forms a fastening device for the oil pump in the oil pan.

11. Internal-combustion engine according to claim 7, wherein the oil pump is disposed on a cover which simultaneously forms a fastening device for the oil pump in the oil pan.

12. Internal-combustion engine according to claim 1, wherein an oil cooler is arranged in the oil pan.

13. Internal-combustion engine according to claim 12, wherein the oil cooler is constructed as an oil-water ring cooler.

14. Internal-combustion engine according to claim 12, wherein the oil cooler is constructed as a plate heat exchanger which is flanged to the oil pan.

15. Internal-combustion engine according to claim 1, wherein the oil pan is made from plastic with a sprayed-around sheet metal bottom element.

16. Internal-combustion engine according to claim 1, wherein the oil pan is constructed as a two-piece diecast aluminum pan, the oil pump being flanged to a flange surface of the oil pan, wherein a portion of the oil pan in which the oil pump is covered by a timing case cover for the internal-combustion engine.

17. Internal-combustion engine according to claim 1, wherein the oil pan is provided with a grid extending at least approximately in the horizontal direction.

18. Internal-combustion engine according to claim 1, wherein at least one of a pressure sensor, a temperature sensor, and a level sensor is inserted into the oil pan.

19. An oil circulating system module adapted to be preassembled and detachably installed as a unit in an internal combustion engine, comprising:

an oil pan housing, oil circulation ducts including duct wall sections formed by an oil pan housing structure, an oil filter housing fixed with the oil pan housing, and an oil pump having an oil pump housing fixed to the oil pan housing.

20. A system according to claim 19, wherein at least a portion of the oil filter housing is formed by a wall portion of the oil pan.

21. A system according to claim 19, wherein the oil pump is disposed on a cover which simultaneously forms a fastening device for the oil pump in the oil pan.

22. A system according to claim 19, wherein the oil pan is made from plastic with a sprayed-around sheet metal bottom element.

23. A system according to claim 19, wherein the oil pan is constructed as a two-piece diecast aluminum pan, the oil pump being flanged to a flange surface of the oil pan, wherein a portion of the oil pan in which the oil pump is covered by a timing case cover for the internal-combustion engine.

24. A method of manufacturing an oil circulating system for an internal combustion engine, comprising:

forming an oil pan with oil pan housing walls, providing oil circulation ducts fixed in the oil pan and formed at least in part by oil pan housing walls, fixing an oil filter housing with the oil pan, fixing an oil pump and oil pump housing in the oil pan housing, and detachably installing said oil pan, oil circulation ducts, oil filter housing, oil pump and oil pump housing as a preassembled unit on an internal combustion engine.

25. A method according to claim 24, wherein at least a portion of the oil filter housing is formed by a wall portion of the oil pan.

26. A method according to claim 24, wherein the oil pan is made from plastic with a sprayed-around sheet metal bottom element.

27. A method according to claim 24, wherein the oil pan is constructed as a two-piece diecast aluminum pan, the oil pump being flanged to a flange surface of the oil pan, wherein a portion of the oil pan in which the oil pump is covered by a timing case cover for the internal-combustion engine.

\* \* \* \* \*